United States Patent [19]
Galloway

[11] 3,751,317
[45] Aug. 7, 1973

[54] METHOD OF FORMING A TABLE FROM A SINGLE BLANK OF HEAT-BENDABLE SHEET MATERIAL

[76] Inventor: James V. Galloway, 190 Sheridan Rd., Winnetka, Ill. 60093

[22] Filed: May 17, 1971

[21] Appl. No.: 143,824

[52] U.S. Cl.................. 156/196, 264/295, 108/161
[51] Int. Cl....................... A47b 13/00, B29d 27/10
[58] Field of Search.................... 156/196, 211, 217, 156/227, 493, 499; 264/154, 295; 108/161

[56] References Cited
UNITED STATES PATENTS

| | | | |
|---|---|---|---|
| 2,157,794 | 5/1939 | MacDonald et al. | 156/211 |
| 2,439,690 | 4/1948 | Lippenberger | 108/161 |
| 2,944,295 | 7/1960 | Sloan | 264/295 |

Primary Examiner—Douglas J. Drummond
Assistant Examiner—M. G. Wityshyn
Attorney—Pendleton, Neuman, Williams & Anderson

[57] ABSTRACT

A table construction is provided which is formed from a single substantially H-shaped blank of thermoplastic material. The table includes a multi-cornered top delimited by a depending skirt and a plurality of depending legs disposed at predetermined corners of said top. Each leg is provided with a pair of elongated angularly disposed flange sections, one of said flange sections being integral with a segment of the depending skirt and the other flange section being secured to and forming a mitre joint with an edge of a second segment of the depending skirt.

3 Claims, 9 Drawing Figures

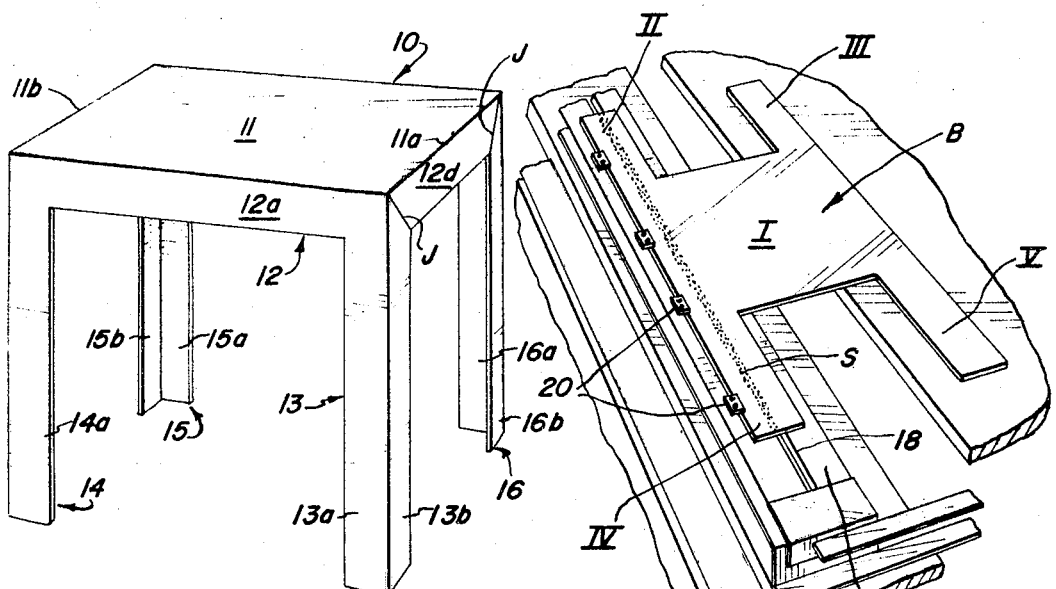
FIG. 1
FIG. 2
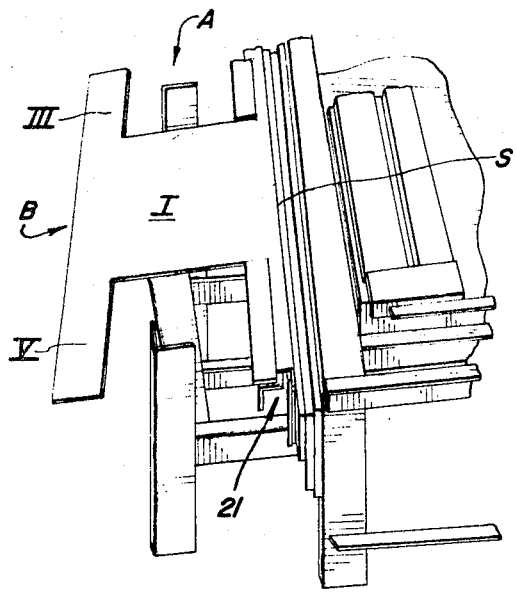
FIG. 3
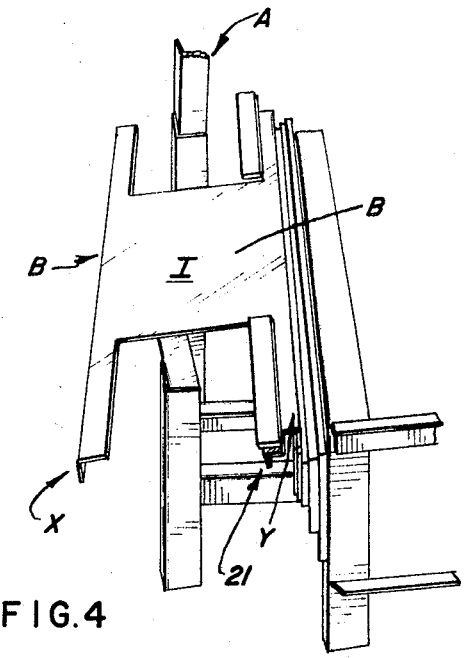
FIG. 4
INVENTOR
JAMES V. GALLOWAY
BY Pendleton, Newman, Williams & Anderson
ATTORNEYS

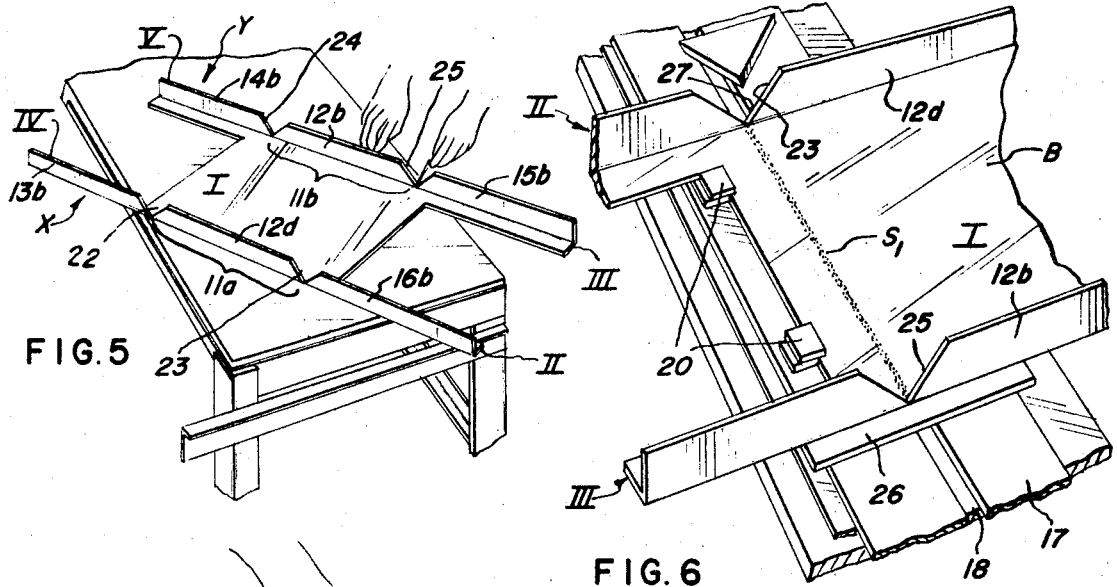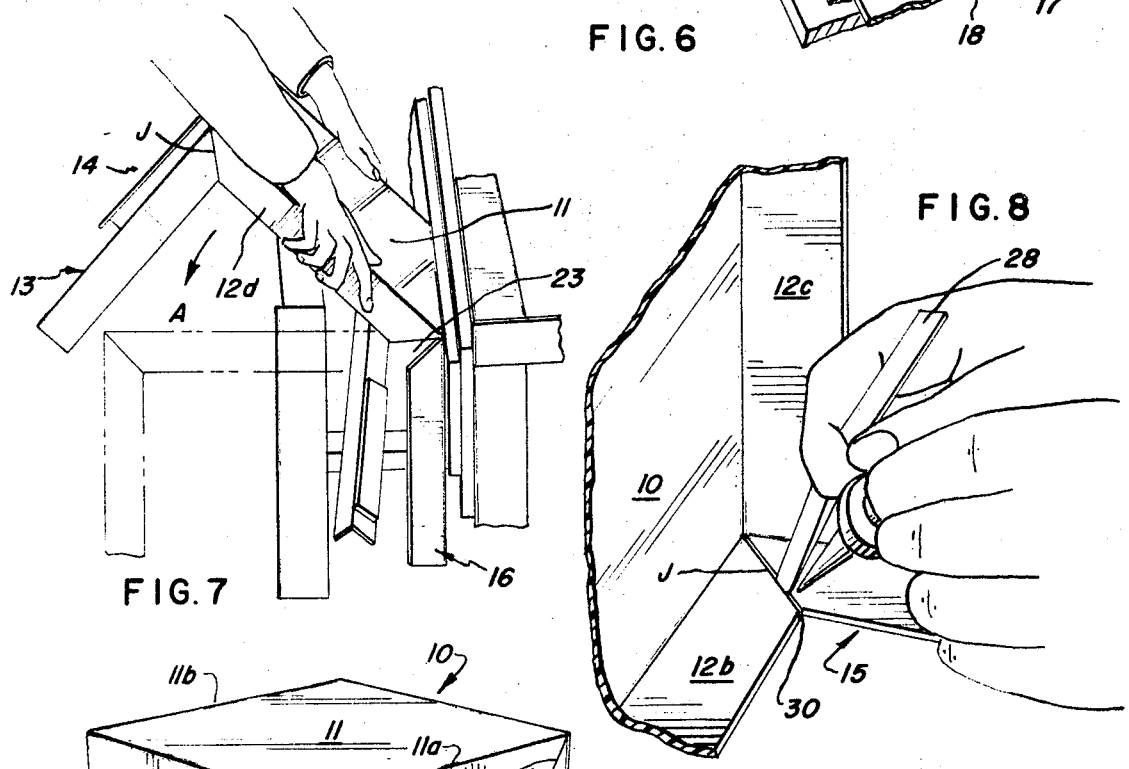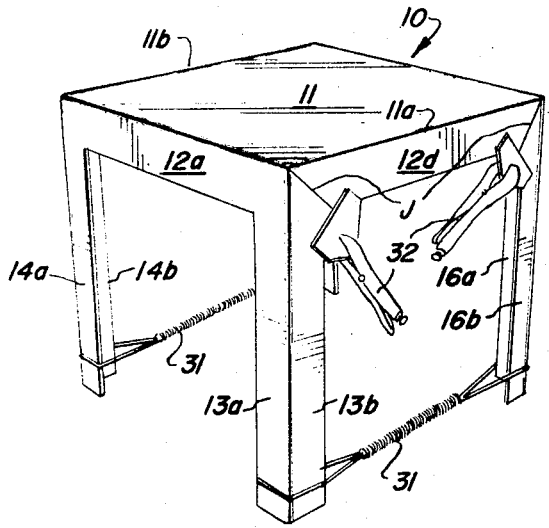

METHOD OF FORMING A TABLE FROM A SINGLE BLANK OF HEAT-BENDABLE SHEET MATERIAL

BACKGROUND OF THE INVENTION

The utilization of sheets of thermoplastic resin material in the formation of various pieces of furniture of contemporary styling has become increasingly popular because of the esthetic appearance and durability which can be achieved by utilizing such material. While the material itself has numerous virtues, working with same to construct tables, racks, etc. oftentimes becomes a difficult and awkward manipulation, requires numerous component parts, involves a substantial amount of manual labor, and considerable waste of material is produced resulting in the initial cost of the furniture to be inordinately high.

Furthermore, when applying heat to the material to form, for example, a mitre joint, there is an inherent tendency for the material to shrink, and as a result, in the past, an unsightly gap (sometimes referred to as a fish-eye) is formed at the inner end of the joint, thereby requiring that such a gap be covered over or filled in with a filler material. Even when filled in, such a gap oftentimes materially detracts from the esthetic appearance of the furniture, and in addition, reduces the strength of the joint itself. For this reason, therefore, it has been customary, when utilizing thermoplastic material in forming a table, for the various components thereof (e.g., top, legs, etc.) to be separate pieces which are cemented or otherwise secured together. Thus, the costs involved in forming the components and then assembling the same together were inordinately high and the esthetic appearance of the finished product was oftentimes diminished by numerous unattractive joints.

SUMMARY OF THE INVENTION

Thus, it is an object of this invention to provide a table which is easy to construct, is possessed of superior strength and has a highly esthetic appearance.

It is a further object of this invention to provide a method of forming a table or the like from a single blank of sheet material wherein the various steps of said method may be readily performed.

It is still a further object of this invention to provide a method of forming products varying widely in size and shape.

It is still a further object to provide a method of forming a mitre joint from a sheet of thermoplastic material wherein no unsightly gap or distortion occurs at one end of the joint.

Further and additional objects will appear from the description, accompanying drawings, and appended claims.

In accordance with one embodiment of this invention an improved table is provided which is formed completely from a single blank of thermoplastic material. The blank has a simple, preferably H-shape configuration. The table includes a multi-cornered top delimited by a depending skirt. Disposed at predetermined corners of the top and depending therefrom are a plurality of legs, each of which is formed of a pair of elongated, angularly disposed flange sections. One of the flange sections is integral with a segment of the depending skirt and the other flange section has an edge thereof secured in an abutting aligned relation with an edge of a second segment of the depending skirt. The abutting edges are in continuous contact throughout and form a strong, unobvious mitre joint.

DESCRIPTION

For a more complete understanding of the invention reference should be made to the drawings wherein:

FIG. 1 is a perspective view of one form of the invention embodied in a table.

FIGS. 2–7 are fragmentary perspective views showing the successive steps involved in forming the table shown in FIG. 1.

FIG. 8 is an enlarged fragmentary perspective view of one of the mitre joints between a segment of the depending skirt and a flange of a leg and showing the application of a bonding material at said joint.

FIG. 9 is a perspective view of the table of FIG. 1 subsequent to the bonding material having been applied at the mitre joints and while awaiting hardening of said bonding material.

Referring now to the drawings and more particularly to FIG. 1, a table 10 is shown which is constructed in accordance with the disclosed invention. In the illustrated embodiment, the table includes a top 11 preferably of a rectangular configuration, a depending skirt 12, and a plurality of legs 13, 14, 15, and 16, one being disposed at each corner of the top. The skirt 12 is provided with sections or segments 12a, 12b, 12c, and 12d which are disposed, respectively, between legs 13–14, 14–15, 15–16, and 16–13, see FIGS. 1 and 8. Skirt sections 12a and 12c are integral with the upper end portions of legs 13–14 and 15–16, respectively. The remaining skirt sections 12b and 12d have the opposite ends thereof diagonally cut and forming a mitre joint J with a portion of the adjacent leg. How each mitre joint is formed will be discussed more fully hereinafter.

Each depending leg 13, 14, 15, or 16 is of like construction and comprises a pair of elongated flanges 13a and b, 14a and b, 15a and b, or 16a and b disposed at right angles to one another.

The illustrated table 10 is formed completely from a single blank B of thermoplastic sheet material (e.g., cast polymethyl methacrylate) having a thickness of approximately ¼ inch to approximately ½ inch.

The thickness of the blank may vary and will depend upon the type of material used and the shape and intended use of the finished product. The blank B, as shown in FIG. 2, has a wide central portion I and two sets of substantially parallel extensions II, III, IV, and V extending laterally outwardly from opposite sides of the central portion. Extensions II–IV and III–V are in axial alignment with one another.

In forming table 10 from blank B, the latter is initially positioned so that the extensions II–IV and the segment of the central portion I aligned therewith, rest upon a horizontally disposed surface 17. The surface 17 is formed of heat insulative material and is provided with an elongated, narrow (approximately ¾ inch wide) rectilinear slot 18 in which is disposed an elongated heating element, not shown. The element may be a rod which is recessed from the surface 17 so as not to directly contact the supported blank.

Spaced a predetermined distance from the slot 18, and arranged in a row which may be substantially parallel to the axis of the slot, are a plurality of upwardly extending stops 20, against which the outer straight edge of the blank engages. The distance the stops are set from the slot in the illustrated table corresponds to the medial axis of the aligned extensions II–IV and III–V. The location of the stops, however, will depend upon the shape of the leg desired.

The heating element may be electrically energized whereby the amount of heat generated can be carefully controlled so as to permit bending of the blank material. The generated heat is confined to a narrow strip S, see FIG. 2. Where, for example, the blank is of ¼ inch cast polymethyl metharcylate, commonly referred to as acrylic plastic, heat in the range of 550°–750° F is applied to the blank surface by the heating element disposed at a distance of approximately 1 to 2 inches for a period of from 1 to 2 minutes. Once the strip S has reached a material-bending temperature, the blank B is removed from surface 17 and the edge of the blank B is inserted in a bending brace 21, see FIG. 3, and the remainder of the blank bent at a right angle in the direction of the arrow A about the heated strip as an axis so as to form an elongated angle member X. The foregoing heating procedure is followed with respect to extensions III and V and then the opposite elongated edge of the blank is inserted in the bending brace 21, see FIG. 4 and the remainder of the blank bent at a right angle in the same direction A about the second heated strip as an axis so as to form an elongated second angle member Y, see FIGS. 4 and 5. It will be noted that angle members X and Y extend upwardly in the same direction from the plane of the remainder of the central portion I.

Subsequent to members X and Y being formed, two longitudinally spaced V-shaped notches 22–23 and 24–25 are formed by any suitable means in each of the members X and Y, respectively, see FIG. 5. The apex of each notch is disposed at the surface of portion I and the distance between the pair of apexes in each member corresponds to the length of an edge segment 11a or 11b of the top 11, see FIG. 1. Corresponding notches 22–24 and 23–25 in the angle members X and Y are transversely aligned with respect to the longitudinal axis of each member. By reason of notches 22 and 23, member X is formed into leg flanges 13b and 16b and skirt segment 12d. Likewise, notches 24 and 25 form member Y into leg flanges 14b and 15b and skirt segment 12b. The included angle in each V notch is 90°.

Once all of the notches have been formed in the angle members X and Y, the partially formed blank B is once again placed upon the support surface 17 with the slot 18 thereof aligned with the apexes of two transversely disposed V-notches 22–24 or 23–25. Before the heating element disposed within the slot is energized, a pair of insulating blocks 26 and 27 are placed in contact with the outer surface of each angle member X and Y in the vicinity of the apexes of the V-notches aligned with slot 18, see FIG. 6. Each block is disposed transversely of slot 18 and serves to prevent the heat generated by the heating element from passing upwardly from the apex. This eliminates shrinkage because the blocks restrict the heat to penetrating the material until it reaches the bottom or apexes of the aligned V notches. It has been found by utilizing the blocks in the manner disclosed prevents the formation of material distortion (fish-eye) at the apexes when the mitre joints are subsequently formed. Material-bending heat is concentrated along narrow strip $S_1$ (see FIG. 6) by the recessed heating element, not shown. The strip $S_1$ interconnects the apexes of V-notches 22–24 or 23–25.

Subsequent to the material-bending temperature of strip $S_1$ being attained, the blank is then positioned in the previously described bending brace 21 so as to cause the blank B to be bent at a right angle in the direction A, see FIG. 7, about strip $S_1$ as an axis until the V-notches are closed so as to form the mitre joints J between one flange of the leg and the adjacent skirt segment. The foregoing heating and bending procedure is followed for both pair of transversely aligned V-notches. Once the strips $S_1$ have cooled to ambient room temperature, the leg flanges and skirt segments will remain in substantially fixed relation, that is to say the mitre joints will remain substantially closed.

To be assured the mitre joints remain closed, a suitable bonding material is applied to the abutting edge surfaces of the mitre joint components, see FIG. 8. As noted in FIG. 8, the abutting edge surfaces may be separated a slight amount by a thin wedge or shim 28 so as to form a narrow crevice 30, into which the bonding material flows.

Once the bonding material has been applied to opposite edges of the skirt segment 12b or 12d, the lower ends of the corresponding legs have a squeezing force applied thereto. In FIG. 9, the squeezing force is shown being applied to the legs by coil spring units 31. Furthermore, the portions of the leg flanges and skirt segments forming the mitre joints J are retained in coplanar relation by suitable clamps 32 while the bonding material hardens. Once the bonding material has hardened, the coil spring units 31 and the clamps 32 are removed and the table is ready for use.

In forming the V-notches, care should be exercised to see that the angular edge surfaces are straight and smoothly cut so that in the finished table, the mitre joints will not be readily discernable and thus, detract from the esthetic appearance of the table. As aforementioned, the blocks 26 and 27 prevent the heat from being applied to the exterior surfaces of the angle members X and Y and thus, no unsightly fish-eye or gap is formed at the apex of the notches, when the blank is folded so as to form the mitre joints. In prior formations of mitre joints utilizing thermoplastic sheet material, such gaps frequently occurred and subsequently required the application of filler material and/or the application of some decorative patch to conceal such gap. The latter operations were time-consuming, costly, frequently unsightly, and resulted in a weakened joint.

The invention has heretofore been described with regard to a table; however, it is to be understood, of course, that it is not to be limited thereto as it has application to various other items of furniture or products wherein mitre joints are employed.

Thus, an esthetic table has been provided which may be readily formed, and yet, is of simple, inexpensive, and structurally sound construction. The method of forming the table or the like enables mitre joints to be utilized without the formation of unsightly gaps or voids.

I claim:

1. A method of forming from a single blank of heat-bendable sheet material a table having a multicornered top, legs depending therefrom, and a skirt depending from the periphery of said top and interconnecting adjacent legs, said blank having elongated leg-forming end members, and a top and skirt-forming center member disposed intermediate said end members, said blank having opposed elongated side edge portions;

said method comprising applying material-bending heat along narrow first strips extending longitudinally throughout the lengths of the opposed elongated side edge portions of the blank; bending the blank along said heated first strips as axes to form right angle flange sections disposed in spaced substantially parallel relation; forming a pair of longitudinally spaced substantially V-shaped notches in each flange section, the apex of each notch terminating at the adjacent narrow first strip, corresponding notches in said flange sections being transversely aligned with respect to said first strips; positioning insulating blocks against the outer surfaces of the flange sections in the vicinity of the notch apexes; applying material-bending heat, while said insulating blocks are in position, along a pair of narrow second strips, each second strip interconnecting the apexes of corresponding notches; bending as a unit about said heated second strips as axes said end members until the V-notches are closed and the inclined edges of each notch are in abutting relation throughout whereby the bent end members form depending table legs and the portions of the flanges intermediate the longitudinally spaced V-notches form segments of the skirt depending from the top of the table; and bonding the edges of the closed notches in said abutting relation.

2. The method of claim 1 wherein said sheet material is a thermoplastic resin of approximately one quarter to approximately one half inch thickness and the heat applied thereto is in the range of 550°–750° F, and the heat source is disposed at a distance of approximately 1 inch to approximately 2 inches from the surface of said blank for a period of from approximately 1 minute to approximately 2 minutes.

3. In a table construction or the like, a method of forming a mitre joint from a blank of thermoplastic material wherein said blank has an upright flange disposed along one edge thereof and said flange has a transversely extending V-notch formed therein with the apex thereof terminating at the juncture of said flange with the remainder of said blank, said method comprising positioning said blank on a heat-insulated support, the latter having an elongated narrow slot formed therein with heating means recessed from the supported surface of said blank, the positioning of said blank on said support being such that the support slot is aligned with the apex of said notch apex and said slot extends transversely of said blank flange; positioning an elongated heat insulated block on said support and spanning said slot, said block engaging the outer exposed surface of said blank flange; heating to a material-bending temperature a narrow strip portion of the blank aligned with said support slot; while said strip portion is at said temperature bending said blank about said strip portion as an axis until the edges of the V-notch abut one another throughout; and bonding said notch edges in said abutting relation.

* * * * *